(12) United States Patent
Hagg et al.

(10) Patent No.: US 9,630,135 B2
(45) Date of Patent: Apr. 25, 2017

(54) HONEYCOMB BODY MADE OF CERAMIC MATERIAL

(71) Applicant: IBIDEN PORZELLANFABRIK FRAUENTHAL GmbH, Frauenthal an der Lassnitz (AT)

(72) Inventors: Christoph Hagg, Graz (AT); Matthias Fail, Deutschlandsberg (AT); Franz Kronabether, Deutschlandsberg (AT)

(73) Assignee: IBIDEN PORZELLANFABRIK FRAUENTHAL GMBH, Frauenthal an der Lassnitz (AT)

( * ) Notice: Subject to any disclaimer, the term of this patent is extended or adjusted under 35 U.S.C. 154(b) by 0 days.

(21) Appl. No.: 14/440,032

(22) PCT Filed: Oct. 3, 2013

(86) PCT No.: PCT/AT2013/000160
§ 371 (c)(1),
(2) Date: Apr. 30, 2015

(87) PCT Pub. No.: WO2014/071424
PCT Pub. Date: May 15, 2014

(65) Prior Publication Data
US 2015/0290574 A1      Oct. 15, 2015

(30) Foreign Application Priority Data
Nov. 8, 2012   (AT) ................ A 1193/2012

(51) Int. Cl.
*B01D 46/24*   (2006.01)
*F28F 7/02*    (2006.01)
(Continued)

(52) U.S. Cl.
CPC .......... *B01D 46/2455* (2013.01); *F23L 15/02* (2013.01); *F28D 17/02* (2013.01);
(Continued)

(58) Field of Classification Search
None
See application file for complete search history.

(56) References Cited

U.S. PATENT DOCUMENTS

| 3,887,741 | A |   | 6/1975 | Dwyer |
| 4,746,479 | A | * | 5/1988 | Hanaki ................ F28F 7/02 264/629 |

(Continued)

FOREIGN PATENT DOCUMENTS

| AT |   6 726 | 3/2004 |
| AT | 412 817 | 7/2005 |

(Continued)

*Primary Examiner* — David Sample
*Assistant Examiner* — Nicholas W Jordan
(74) *Attorney, Agent, or Firm* — Cozen O'Connor

(57) ABSTRACT

A honeycomb body of ceramic material for use in installations for cleaning and/or regenerating gases, comprising a prismatic body, which is penetrated by many rectilinear gas-flow channels parallel to one another, which discharge into both face ends of the honeycomb body, wherein the honeycomb body (1) has at least one tubular recess (5, 5'), which is oriented transversely to the direction of the flow channels (4).

4 Claims, 2 Drawing Sheets

(51) Int. Cl.
*F23L 15/02* (2006.01)
*F28D 17/02* (2006.01)

(52) U.S. Cl.
CPC ............ *F28F 7/02* (2013.01); *F28F 2250/04* (2013.01); *Y02E 20/348* (2013.01)

(56) References Cited

U.S. PATENT DOCUMENTS

| | | | |
|---|---|---|---|
| 5,108,685 A | 4/1992 | Kragle | |
| 5,373,634 A * | 12/1994 | Lipp | ................ F28F 7/02 165/185 |
| 5,855,781 A * | 1/1999 | Yorita | ................ B01D 29/31 422/180 |
| 6,077,436 A * | 6/2000 | Rajnik | ................ B01D 53/22 502/527.18 |
| 6,227,699 B1 | 5/2001 | Wight | |
| 2006/0219397 A1* | 10/2006 | Bruun | ................ F28F 7/02 165/165 |
| 2010/0154640 A1* | 6/2010 | Hagg | ................ B01D 53/885 55/484 |
| 2010/0270011 A1* | 10/2010 | Takahashi | ................ F28F 7/02 165/148 |
| 2012/0148794 A1* | 6/2012 | Keller | ................ C04B 35/80 428/117 |

FOREIGN PATENT DOCUMENTS

| | | | |
|---|---|---|---|
| CN | 201 152 709 | 11/2008 | |
| EP | 0 315 047 | 5/1989 | |
| EP | 0 472 605 | 5/1990 | |
| JP | 2007 198706 | 8/2007 | |
| WO | WO 97/27385 | 7/1997 | |
| WO | WO 2010127211 A2 * | 11/2010 | ................ F28F 7/02 |

* cited by examiner

HONEYCOMB BODY MADE OF CERAMIC MATERIAL

RELATED APPLICATIONS

This is a U.S. National Phase Application under 35 USC 371 of International Application PCT/AT2013/000160 filed on Oct. 3, 2013.

This application claims the priority of Austrian application no. A 1193/2012 filed Nov. 8, 2012, the entire content of which is hereby incorporated by reference.

FIELD OF THE INVENTION

The invention relates to a honeycomb body of ceramic material for use in installations for cleaning and/or regenerating gases, having a prismatic body, which is penetrated by many rectilinear gas-flow channels parallel to one another, which discharge into both face ends of the honeycomb body.

BACKGROUND OF THE INVENTION

Ceramic honeycomb body structures are widely used both in the thermal regenerators of waste air cleaning installations and for regenerating process air. Various ceramic honeycomb bodies are known, for instance from EP 0 472 605 B1, which are used as heat accumulator compounds in regenerators in waste gas treatment installations. These honeycomb bodies are typically disposed in stacks, and at least two honeycomb bodies are aligned with their channels in the direction of the respective gas flow, optionally spaced apart from one another.

The known heat accumulator compounds are ceramic honeycomb bodies which are embodied substantially prismatically, which have channels parallel to the primary prism axis with intersecting, essentially equal channel cross sections, and which have a specific surface area between 200 and 3000 $m^2/m^3$ and a hydraulic diameter between 1 and 12 mm.

Because of the aligned arrangement of the prismatic honeycomb bodies, and in particular of their channels, the flow profile of the cross section of the heat storage chamber continues throughout all the layers of the stack. Even in zones in which there is little or no flow in a layer oriented toward the inflow side of the gas, there is a flow in the same way as in the preceding layer, because of the aligned arrangement of the channels as their course continues. The same is true for zones and channels with a strong flow through them. The continuation of the flow profile through the heat storage chamber layers is accordingly due essentially to the aligned arrangement of the channels or prisms and to a virtually continuous laminar flow.

To achieve the greatest possible thermal efficiency with a simultaneously low pressure loss, regenerator beds are often designed with very large bed cross sections. However, the theoretically high degrees of heat recovery sought can be achieved only with the highest possible degree of utilization of the available heat accumulator compound. A high degree of utilization is equated among other things with the most uniform possible oncoming flow and/or a homogeneous flow distribution over the bed cross section. Large bed cross sections, unfavorable valve or flap positions, and overly low pressure losses over the regenerator bed make this goal harder to achieve. Often, bed cross sections are specified, since existing installations with low-efficiency heat storage materials and a high pressure loss (such as bulk material packing) are involved. Therefore, a substitution of more-efficient honeycomb bodies and a low pressure loss is sought. The theoretical heat recovery values are in practice often not achieved then, because as a result of the low pressure loss and/or the unfavorable oncoming flow conditions, a homogeneous flow through the regenerator bed cannot be attained, and zones with a high flow through them as well as zones with little or no flow through them develop in the regenerator bed. The zones with a low flow through them make hardly any contribution to heat recovery, and the theoretical total efficiency is accordingly not attained because of the poor flow distribution.

As a result of the present noncommunicating channel structure in ceramic honeycomb bodies, air flows inside a honeycomb body are unable to mix or be distributed. Stacking the ceramic honeycomb bodies on flat bases does not allow any transverse flow between the layers.

By the use of honeycomb bodies with structured end face geometries (for instance as in Austrian Patent Document AT 412 817 B), significant improvements in the transverse flow within a regenerator bed can be attained; however, attaining the desired effects requires multiple layers of structured honeycomb bodies, and zones in the inlet region and in the middle region of the regenerator bed exhibit flow deficits.

SUMMARY OF THE INVENTION

One object of the invention is to develop a honeycomb body which makes it possible for the air flow, despite poor distribution upstream of the inlet into the regenerator bed, to be distributed as much as possible over the entire bed cross section already soon after inlet. The inlet region of a regenerator bed should be understood to mean both the cold zone on the inlet side and the hot zone on the outlet side in a multichamber construction.

At present, in regenerator beds with unfavorable oncoming flow conditions, the following provisions are employed in order to achieve the earliest possible transverse flow (that is, earliest with respect to the distance the flow has traveled inside the bed):

A) Layers with ceramic saddle packing (bulk material)
B) Layers with diagonal channel structures (Sulzer plates)
C) Perforated metal sheets beneath the regenerator bed With respect to A): The use of ceramic saddle packing in the bottommost and topmost layers of a regenerator bed, because of the high pressure loss (turbulent flow through the saddle packing) and its open structure, has the result that the air flow within that layer is horizontally well distributed. The disadvantages of these saddle packing layers are the high risk of clogging, the low degree of heat recovery of the saddle packing, and the partial shifting of the adjoining horizontal honeycomb body channels. Moreover, the bulk density of the saddle packing during operation of the installation can vary because of thermal and mechanical factors and can disadvantageously change the position of the honeycomb body elements stacked above them.

With respect to B): Honeycomb bodies with diagonal channels (Sulzer plates) are on the market in the form of products called "Flex Ceramics" and, in comparison to honeycomb bodies with longitudinal channels, they have a substantially smaller heat exchange surface area and therefore less thermal efficiency. The desired transverse flow is achieved only by means of a relatively high structural height of this layer, which is at the cost of the overall efficiency of the installation.

With respect to C): Perforated metal sheets under the regenerator bed can be planned for accordingly in new installations, but in existing installations they can be provided by retrofitting only at very great effort and expense. It is a disadvantage of these perforated metal sheets that they can be used only in the cold region of the installation, and corrosion-stable materials are relatively expensive.

One object of the invention is to avoid the problems described of the honeycomb body structures in the prior art and to achieve the best possible transverse flow within a ceramic honeycomb body or a layer of honeycomb bodies. This object is attained according to an embodiment of the invention by tubular recesses arranged transversely to the channel direction of the honeycomb bodies; with these recesses, zones in which the air flow can be distributed transversely to the specified flow direction of the air flow are created inside the honeycomb body.

Thus when the honeycomb bodies are stacked, a network-like open tube structure is created, which makes a significant transverse flow inside a honeycomb body layer possible.

Advantageously, two tubular recesses intersecting one another are provided, which each extend between two side faces, opposite one another, of the prismatic honeycomb body.

In another embodiment of the invention, the tubular recesses are shaped by a machining method in the unfired honeycomb body.

According to an embodiment of the invention, built-in fixtures in the tubular recesses can also be provided, which on the one hand further promote the transverse flow or turbulence of the air flow, an example being static mixer structures.

Some advantages of the invention over the known heat storage bodies are a compact construction and mechanical stability;

the possibility of using this technology for all kinds of cell geometries and corresponding applications;

achieving a high degree of transverse flow in proportion to the distance traveled in the flow direction;

ensuring a high degree of heat recovery in the remaining honeycomb structure;

not increasing the risk of clogging compared to the standard honeycomb structures; and enabling use even in the hot zones of the regenerator bed.

BRIEF DESCRIPTION OF THE DRAWINGS

The invention will be described in further detail below in terms of exemplary embodiments in conjunction with the drawings. In the drawings.

DETAILED DESCRIPTION OF THE DRAWINGS

Figure 1:
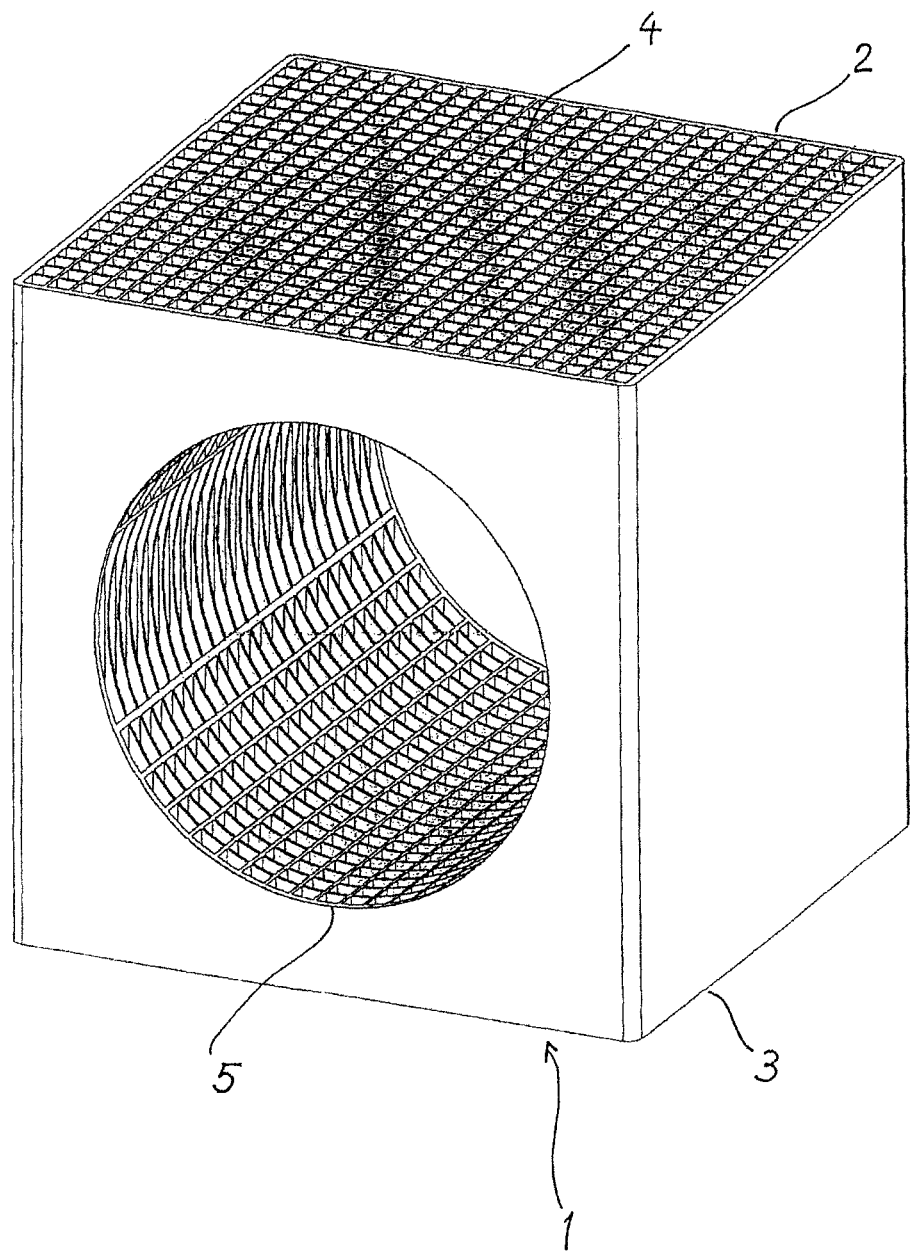
FIG. 1 shows a first embodiment of a honeycomb body of the invention in a perspective view.
Figure 2:
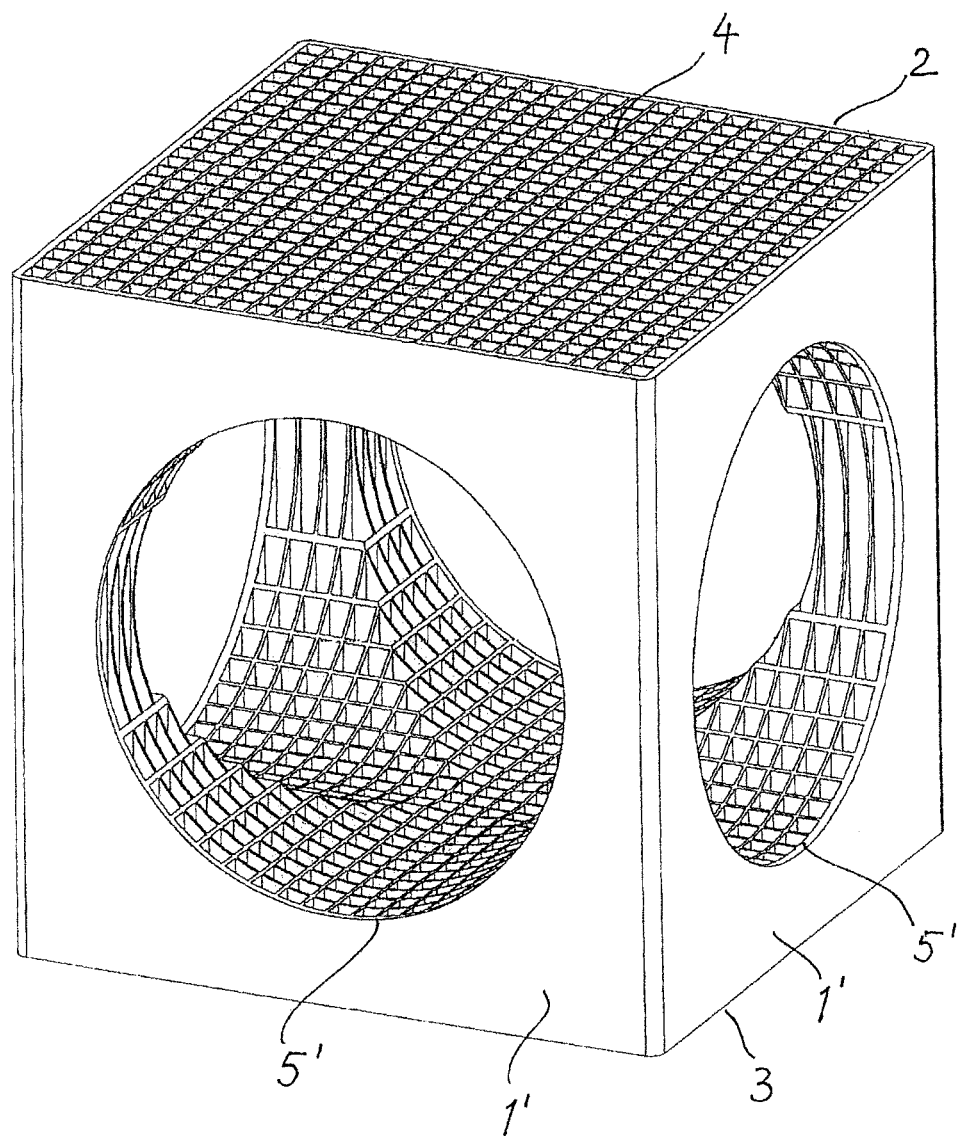
FIG. 2 shows a second embodiment of a honeycomb body of the invention.

The ceramic honeycomb bodies 1 shown in FIGS. 1 and 2 have the form of a rectangular prism, with side faces 2, 3 that are parallel to one another. The honeycomb bodies 1 are penetrated by rectilinear channels 4, parallel to one another, of rectangular cross section, which extend between the side faces and are separated from one another by thin-walled webs. The channels 4 could also have a square cross section. For practical use, the honeycomb bodies 1 can for instance have a prism length of approximately 0.1-1.0 m, in particular approximately 0.15-0.3 m, and a prism end face side length of approximately 0.1-0.5 m, preferably 0.1-0.30 m.

The honeycomb bodies 1 shown in FIGS. 1 and 2 are expediently produced by extrusion (prior to firing), for instance as 43×43 cell honeycomb bodies 1 with a geometry of 150×150×150 mm$^3$ and with flow channels 4 of 2.9×2.9 mm, and/or a cell wall thickness of 0.5 mm.

As FIGS. 1 and 2 also show, the honeycomb bodies 1 are provided with tubular recesses 5, 5'. After the extrusion, the tubular recesses 5, 5' are obtained by machining methods performed on the "green" (unfired) honeycomb bodies 1, preferably by drilling, using a core drill of suitable diameter.

Drilling the recess 5 in FIG. 1 is done via a unilateral drilling operation through the entire cross section of the honeycomb body 1. Alternatively, in FIG. 2, two drilling operations are performed, each as far as the center of the honeycomb body 1, for instance. To attain the crosswise-arranged tubular recesses 5' of FIG. 2, each extending extend between two side faces 1' opposite one another, the honeycomb body 1 is processed twice (in the variant where drilling is done all the way through, they are offset by 90° each) or four times (offset each time by 90°, in the variant where drilling is done as far as the middle of the honeycomb body).

In practical use, the honeycomb bodies 1 of the invention are lined up with one another and stacked one above the other. For instance, two honeycomb bodies 1 stacked one above the other can each be rotated by 90° from one another in the stack. When honeycomb bodies 1 which have two intersecting tubular recesses 5' are lined up or stacked, the result in each layer is a network-like, open tube system with an extraordinarily favorable transverse flow. However, it is also possible for only the lowermost or the two lowermost honeycomb body layers in a stack to be provided with tubular recesses 5, 5' in the honeycomb bodies 1; then the layers located above them comprise standard honeycomb bodies 1 without tubular recesses 5, 5'.

The invention claimed is:

1. A honeycomb body of ceramic material for use in installations for cleaning and/or regenerating gases, comprising a prismatic body, which is penetrated by many rectilinear gas-flow channels parallel to one another, which discharge into two face ends of the honeycomb body, wherein the honeycomb body has at least one tubular recess, which is oriented transversely to the direction of the gas-flow channels, and wherein the at least one tubular recess has a cross-section dimensioned such that the number of gas-flow channels of a transverse plane of the prismatic body lying transverse to the side of the prismatic body into which the tubular recess opens is greater than the number of gas-flow channels of the transverse plane that are not connected by the at least one tubular recess.

2. The honeycomb body of claim 1, wherein the at least one tubular recess comprises two tubular recesses intersecting one another, each of the two tubular recesses extending between two side faces, opposite one another, of the prismatic body.

3. The honeycomb body of claim 2, wherein the two tubular recesses are shaped by a machining method in the honeycomb body in an unfired state.

4. The honeycomb body of claim 1, wherein the at least one tubular recess is shaped by a machining method in the honeycomb body in an unfired state.

* * * * *